United States Patent [19]

Pipon et al.

[11] Patent Number: 4,950,088
[45] Date of Patent: Aug. 21, 1990

[54] SLIDE HAVING AN UPPER PROFILE ELEMENT AND A LOWER PROFILE ELEMENT DESIGNED FOR MAKING A FLOATING LATCH THEREBETWEEN

[75] Inventors: Yves Pipon; Georges Droulon, both of Flers, France

[73] Assignee: A & M Cousin Establissements Cousin Freres, Orne, France

[21] Appl. No.: 432,640

[22] Filed: Nov. 7, 1989

[30] Foreign Application Priority Data

Nov. 10, 1988 [FR] France .................... 88 14697

[51] Int. Cl.$^5$ ........................................... F16C 29/10
[52] U.S. Cl. ............................................ 384/47; 384/34
[58] Field of Search ................. 384/47, 18, 17, 21, 384/34, 49; 296/65

[56] References Cited

U.S. PATENT DOCUMENTS

| | | | |
|---|---|---|---|
| 3,759,587 | 9/1973 | Christin | 384/47 |
| 4,487,459 | 12/1984 | Rees | 384/34 |
| 4,660,795 | 4/1987 | Ikegaya et al. | 384/47 |
| 4,787,756 | 11/1988 | Pilarski | 384/47 |

Primary Examiner—Lenard A. Footland
Attorney, Agent, or Firm—Browdy and Neimark

[57] ABSTRACT

The lower profile element is substantially of a U-shaped section and includes wings having each a median zone with a semi-cylindrical channel prolongated by a bent-over portion provided for covering V-bent vertical ends of side branches of the upper profile element. A wing of the lower profile element is cut out in order to form a row of teeth having each a trapezoidal shape prolongated by a rectangular shape in order to cooperate with an L-section latch-comb formed with rectangular openings and freely mounted on a pin which is displacable by a control of the slide. A spring applies to the latch-comb a pressure permitting a passage of teeth of the latch-comb through openings formed in the upper profile element so as to cause a penetration of the latch-comb into the openings between the row of teeth of the lower profile element for latching the upper profile element on the lower profile element.

7 Claims, 7 Drawing Sheets

SLIDE HAVING AN UPPER PROFILE ELEMENT AND A LOWER PROFILE ELEMENT DESIGNED FOR MAKING A FLOATING LATCH THEREBETWEEN

FIELD AND BACKGROUND OF THE INVENTION

The purpose of the present invention is to provide a slide having an upper profile element and a lower profile element designed for making a floating latch slide ensuring a reliable and fast snap-in engagement, in all cases, of the upper slide element with respect of the lower slide element.

Design of the upper profile element and of the lower profile element of the slide is studied so as to obtain the largest possible strength with normal deformations when used, while utilizing small metal sheet thicknesses, or at least metal sheet thicknesses smaller than those used in common practice for a same result.

In the present case, there is therefore obtained a complete slide of a smaller weight, having a good operation and also exhibiting a good tearing strength and, in limit cases, enabling a sufficient deformation of the slide prior to a tearing off of the upper profile element with respect to the lower profile element, thereby providing a considerable energy absorption which therefore protects the passenger seated on the seat in event of an accident.

The present design of the slide provides also a protection of the passenger seating on the rear seat and who, under effect of an impact, and even if he stretches his arms to protect himself or if his bust is projected frontwardly, does not find himself in front of a rigid wall but in front of a wall which deforms itself and which thus absorbs a certain quantity of energy protecting the passenger.

The following description shows that the upper and lower profile elements have, because of their shape, a considerable strength. It should also be noted that such profile elements have been created so that the upper profile element is generally of a thickness smaller than that of the lower profile element with a concern of obtaining a deformation for absorbing energy, but also for obtaining a constriction of the upper profile element on the lower profile element, thereby permitting a perfect operation of the slide.

In the following disclosure, there is disclosed a slide according to the invention, which slide can be used as such when the seat includes only one slide, or on the contrary can be mounted in a standard way, that is with two slides placed parallel to one another at a certain distance from each other for receiving the seating armature of a seat.

In the latter case of using two slides, it is possible to control the two slide floating latches with an assistance of a single control means placed either underneath the seat when there is an arcuate member forming a rudder bar, or on the right or on the left of the seat when there is an operating handle.

It is also possible that the floating latch of the slide is rigidly connected to a fixed portion, viz. the floor of a vehicle, and, in that case, the mobile portion of the slide carries a toothing cooperating with the aforementioned latch.

Moreover and as in the previous case, it is possible to conceive a control means which is either manual or power operated (through electrical or pneumatic means), so as to unlatch and latch the toothing in consideration with respect to the floating latch.

Openings are formed on the upper profile element of the slide and just in the mounting position of the floating latch, these openings enabling the teeth of the comb forming the floating latch to extend through the upper profile element and to interlock with the toothing provided on one of the sides of the lower profile element, with this toothing being a continuous toothing cut out on almost the totality of the length of the lower profile element and having for each opening a substantially trapezoidal shape, facilitating thus a penetration of the teeth of the comb forming the floating latch which is mounted on a pin maintained in a casing made rigid with the inner side wall of the upper profile element of the slide.

Since the floating latch can tilt in one direction or the other with respect to its fixation pin, there is obtained, and whatever the relative position of the toothing of the lower fixed profile element of the slide with respect to the upper mobile profile element carrying the latch, that the teeth of this latch will always extend inside the toothing of the lower fixed profile element of the slide while avoiding a so-called "machine-gun" effect which very often occurs with normal slides since the teeth of the latch or comb can slide in a continuous manner on the upper surface of the lower fixed profile element toothing without penetrating in the spaces between teeth, and therefore do not allow a latching of the slide, which is very dangerous if this phenomenon occurs in the even of an accident since the seat, and therefore the passenger which represent a large mass, is not fixed with respect to the vehicle and can therefore be brutally driven, with all the consequences resulting therefrom.

The floating latch of the present invention allows therefore, as hereabove indicated, and in all case, a reliable and rapid latching of the fixed profile element of a slide whatever the mounting conditions even, on the one hand, if there is an angular offset in the horizontal plane of the bearing zones of the lower profile elements and, on the other hand, if the plane upper portions underneath the backing base also exhibits a horizontal angular offset which can be amplified by the mounting of a device for setting the height of the seat base.

Actually, the floating mounting of the latch or comb provides for an automatic elimination of any backlash.

SUMMARY OF THE INVENTION

According to the invention, the lower profile element is substantially of a U-shaped cross sectional shape and includes wings having each a median zone with a semi-cylindrical channel prolongated by a bent-over portion provided for covering V-bent vertical ends of side branches of the upper profile element, whereby contours are defined on each side of the slide for containing each a set of balls separated by a rod, then a wing of the lower profile element is cut out in order to form a row of teeth having each a trapezoidal shape prolongated by a rectangular shape in order to cooperate with an L-section latch-comb formed with rectangular openings, this latch-comb being freely mounted on a pin with said pin being displaceable by a control of the slide, then a spring applies on this latch comb a pressure permitting a passage of teeth of the latch comb through openings formed in the upper profile element, so as to cause a penetration of this latch comb into the openings between the row of teeth of the lower profile element for latching the upper profile element on the lower profile element.

According to another feature of the invention, the latch-comb has preferably, in both directions, an inclination of several degrees with respect to horizontal, and this in general at a moment of release of latching, thereby allowing the latch-comb to penetrate into the teeth so to hold the upper profile element with respect to the lower profile element.

Various other features of the invention will become more apparent from the hereafter detailed description.

BRIEF DESCRIPTION OF THE DRAWINGS

Embodiments of the invention are shown by way of non limiting examples in the accompanying drawings, in which:

FIGS. 12 and 13 are partial cross-sectional views, as seen along lines A—A and B—B, of the control lever shown in FIGS. 10 and 10a;

DETAILED DESCRIPTION OF THE INVENTION

Figure 1:
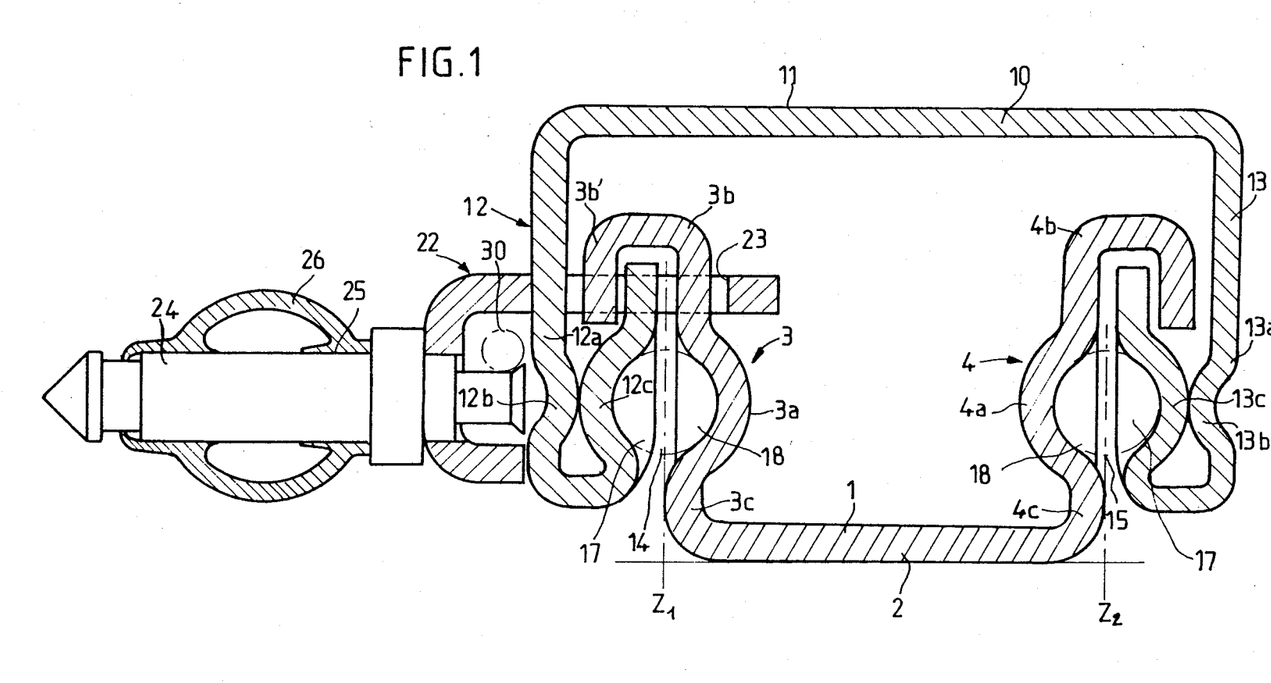
FIG. 1 is a cross-sectional elevation view of a slide according to the invention.

Referring now to the drawings, FIG. 1 shows an end view of the slide of the invention with the fixed lower profile element 1 of the slide which has substantially in cross section the shape of a U letter and a bottom 2 of which is flat and largely dimensioned so as to allow a fixation of the slide via the bottom 2, either directly on a vehicle floor or with assistance of a base plate, and this by any appropriate means (bolts, bolts and nuts, spot welding, etc.).

As the bottom 2 is totally free, the wings 3, 4 of the U forming the fixed lower profile element of the slide are conformed in zones 3a, 4a so as to substantially define half-cylinders, then the ends 3b, 4b of the wings 3, 4 are bent outwardly in the shape of a U.

It should be noted that a lower curve 3c, 4c is made at the junction with the bottom 2 so as to cause a certain amount of deformation bringing the outer edge of each curve on the vertical axis $Z_1$, $Z_2$ which will be used as a centering axis for balls placed between the fixed element of the slide and the mobile element of the slide.

There is thus obtained, in zones of the lower curves 3c, 4c, an excellent deformation strength of the slide lower profile element and a very large bearing zone for the balls.

Figure 5:
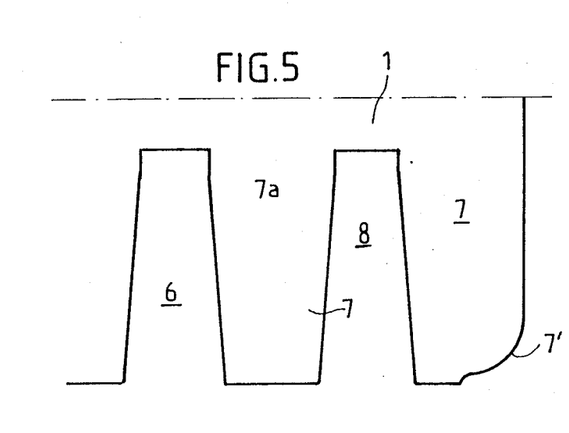
FIG. 5 is an enlarged partial side elevation view of the toothing of the fixed element of the slide, shown in its developed shape.

As shown in the drawings, the end 3b of the wing 3 has a wing 3b' which is cut out so as to form a toothing 6 of which an enlarged developed view is shown in FIG. 5, and of which each tooth 7 is of a trapezoidal shape prolongated by a rectangular shape 7a, whereby the void portions 8 have a similar but smaller shape. The trapezoidal shape of the tooth 7 avoids, during the folding step of the wing 3 in the shape of a reverse U (see FIG. 1) that the material, when being bent and deformed, will fill the toothing with outgrowths which would prevent the comb from entering the passage 8. Only the end teeth are rounded on their extreme portion 7' for avoiding any aggression during the various handling and mounting or storing operations of the raw blanks when they exit from the press tools.

As regards the upper mobile profile element 10 (see FIG. 1), it has in cross section the shape of a reverse U, the bottom 11 of which is perfectly plane so as to facilitate the fixation, on the upper face of this bottom 11, of the junction members of the seat base armature The bottom 11 is also formed at a sufficient distance of the upper portion of the U-shaped ends 3b, 4b of the lower profile element 1.

Moreover, the side branches 12, 13 of the upper profile element are rectilinear up to lower zones 12a, 13a where the ends of the side branches 12, 13 are shaped as a flattened V with branches 12b, 12c, 13b, 13c tightly applied on one another. There is thus obtained, in the lower zone of the upper profile 10, a reinforcement which therefore increases the strength of the slide in its zones where the greatest efforts are exerted and permits also a setting in position of balls 14 and 15. The balls 14 and 15 are generally four in number (two on each side of the slide) and are separated by a separating rod 16 shown in FIG. 2 and disposed between two of them placed on the same side of the slide.

Moreover, so as to correctly limit the displacement of the balls 14 and 15 in the channels formed by the covering of the lower profile element 1 by the upper profile element 10, abutments 17, 18 formed by deformation of the wings of the lower profile element 1 are provided at the ends of the channel.

Figure 2:
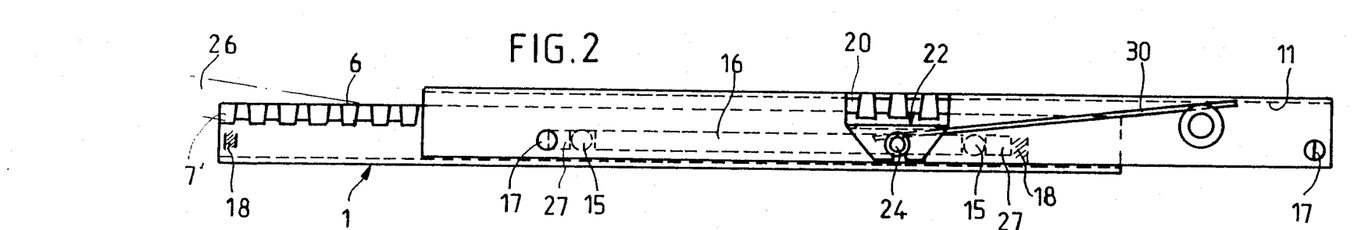
FIG. 2 is a longitudinal side elevation view of the slide of FIG. 1.
Figures 3, 4:
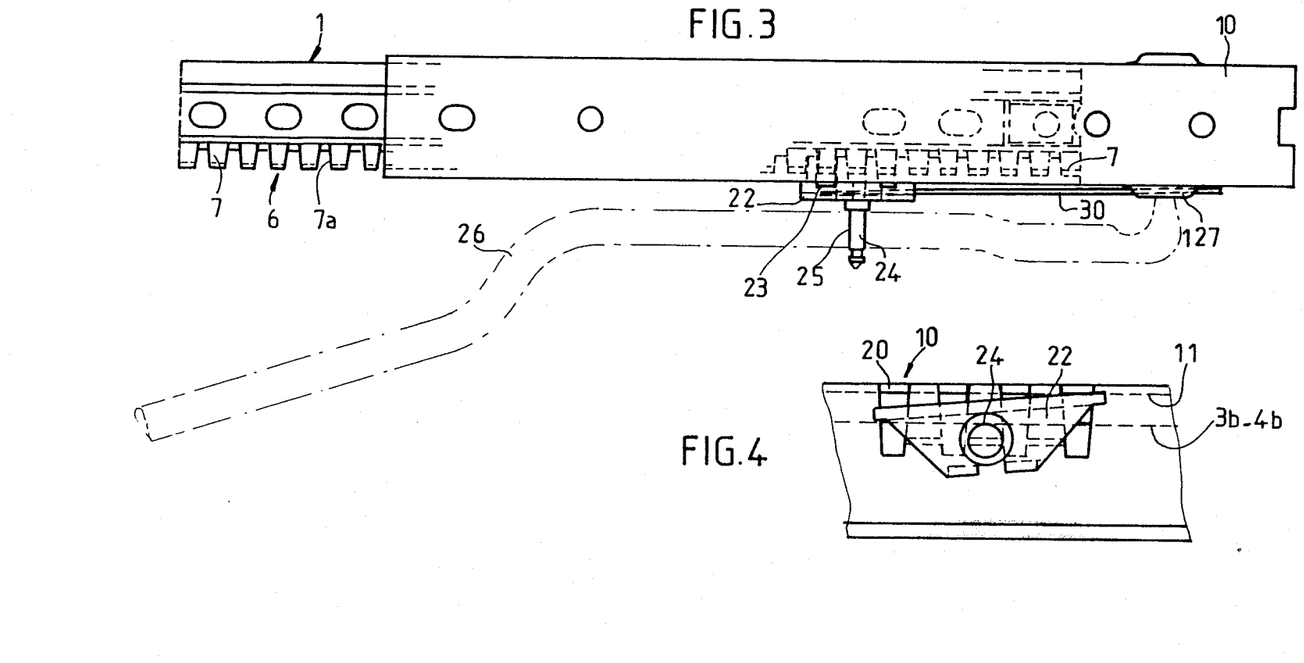
FIG. 3 is a plan view corresponding to FIG. 2.
FIG. 4 is an enlarged side elevation view of a latch floating on the slide of FIG. 1.
Figure 6:
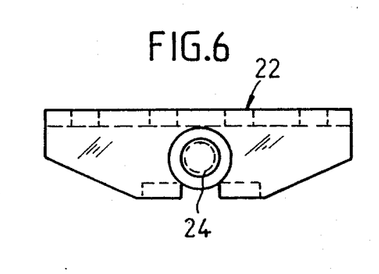
FIG. 6 is a front elevation view of the floating latch of FIG. 4.
Figure 7:
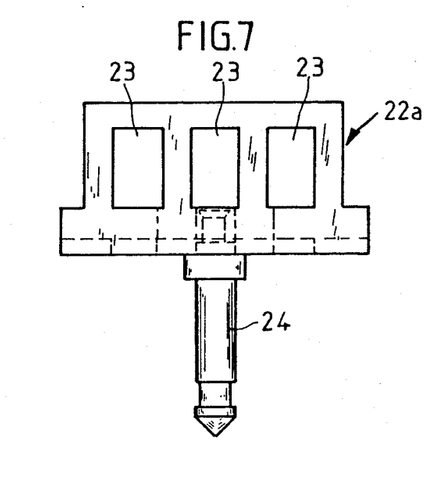
FIG. 7 is a plan view corresponding to FIG. 6.
Figure 8:
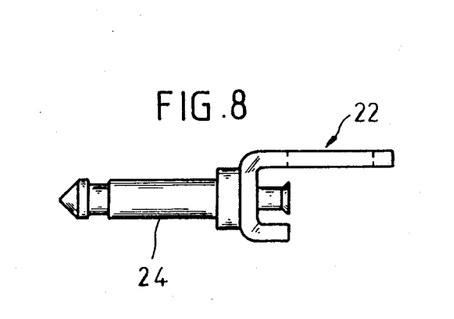
FIG. 8 is a side elevation view corresponding to FIG. 6.

As shown in FIGS. 2 to 4, openings 20 are also provided in the upper profile element 10, the openings 20 having the same shape as the toothing 6 of lower profile element 1, but the openings 20, which are four in number in the present case, provide a setting in position of a latch or comb 22 (see FIGS. 1, 6 and 7) formed of an L-shaped part with three rectangular openings 23 in its larger side 22a. The smaller wing of the latch or comb 22 carries a pin 24 which can journal inside a hole 25 of a rudder bar 26 used for controlling the slide, this rudder bar 25 being articulated inside a bearing 127 solid with the rear portion of the upper profile element 10 of the slide (see FIG. 3). Thus, the latch or comb 22 is totally free in rotation with respect to the upper profile element 10, the teeth of which enable a penetration of the openings 23 in direction of the teeth 7 carried by the wing 3b' of the lower profile element 1.

. It should be mentioned that the position of the latch or comb 22 is subjected to action of a spring 30 (see FIG. 1) which tends to cause the openings 23 of the comb 22 to penetrate through the openings 22 of the upper profile element 10, and to bring at the same time the openings 23 on the teeth 7 of the wing 3b' of the lower profile element 1. The spring 30 is a rectilinear spring supported on the outer side of the upper profile element 10 of the slide.

When the rudder bar 26 is released, it is possible that the latch or comb 22 is in the position shown in FIG. 4, i.e. slanting by a great angle with respect to horizontal. Therefore, the latch or comb 22 will come regularly in mesh with at least one of the interstices of the row of teeth 7 of the lower profile element 1 and there is therefore always an immediate interlocking, thereby preventing the latch or comb 22 from sliding on the top of the teeth. There is thus obtained a latching of a good quality and which is very fast without any possibility of a occurrence of a so-called "machine-gun" phenomenon.

However, the disengagement of the latch or comb 22 from the slide 6 is very rapid because of the considerable lever arm formed by the rudder bar 26, and there is therefore an extremely flexible and efficient liberation of the upper profile 10 with respect to the lower profile element 1 with a small raise of the rudder bar 26 which is placed underneath the base of the seat in consideration.

Although not shown, it is possible to replace the rudder bar 26 by a lever placed on one of the sides of the seat and which controls, via a transverse bar conveniently bent, the two pins 24 carrying the latch or combs 22.

The slide is therefore endowed with very large strength qualities due to the cross-sectional conformation of the lower and upper profile elements 1 and 10, and is capable of a very flexible movement due to the perfect sliding of the balls 14, 15 which are guided in identical bearing zones between the upper profile element 10 and the lower profile element 1. By causing an offset of the axis of the balls 14, 15 with respect to the axis of the clearance formed between the two opposite faces of the lower profile element 1 and upper profile element 10, there is obtained such a soft and flexible sliding movement.

Moreover however, the floating latch or comb 22 which cooperates with toothings of a trapezoidal-rectangular shape provides for a perfect anchoring of the upper profile element 10 with respect to the lower fixed profile element 1.

Although it has already been indicated that the thickness of the upper profile element 10 is generally smaller that the thickness of the lower profile element 1, it is also possible in some cases to use for the manufacture of the upper profile element 10 a metal sheet of a practically identical thickness as that of the lower profile element 1. This is generally the case when "deluxe" vehicle seats are involved, which seats are to be provided on vehicles moving at very high speeds.

According to the alternative embodiments shown in FIGS. 9 to 18, the upper profile 100 of the slide (see FIGS. 9, 10 and 11) is provided with a control lever 108 which is formed laterally with a reverse W-shaped opening 101 having in its center two rounded portions 102, 103 which are used both for maintaining and for enabling a tilting of the floating latch or comb 104 corresponding to the floating latch or comb 22.

Figure 9:
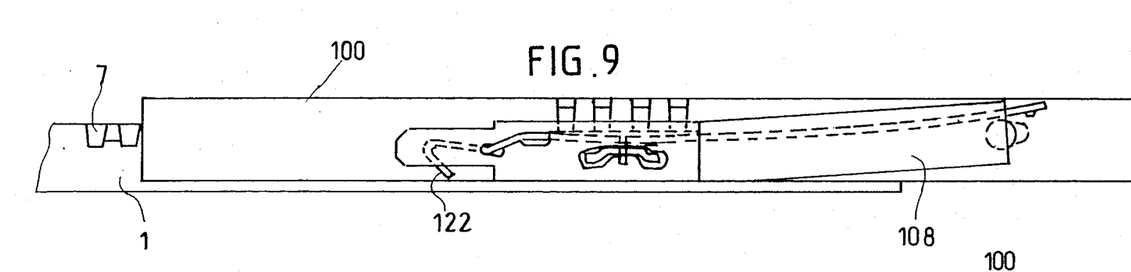
FIG. 9 is an alternative embodiment of the floating latch and of the control lever.
Figures 10, 10A:
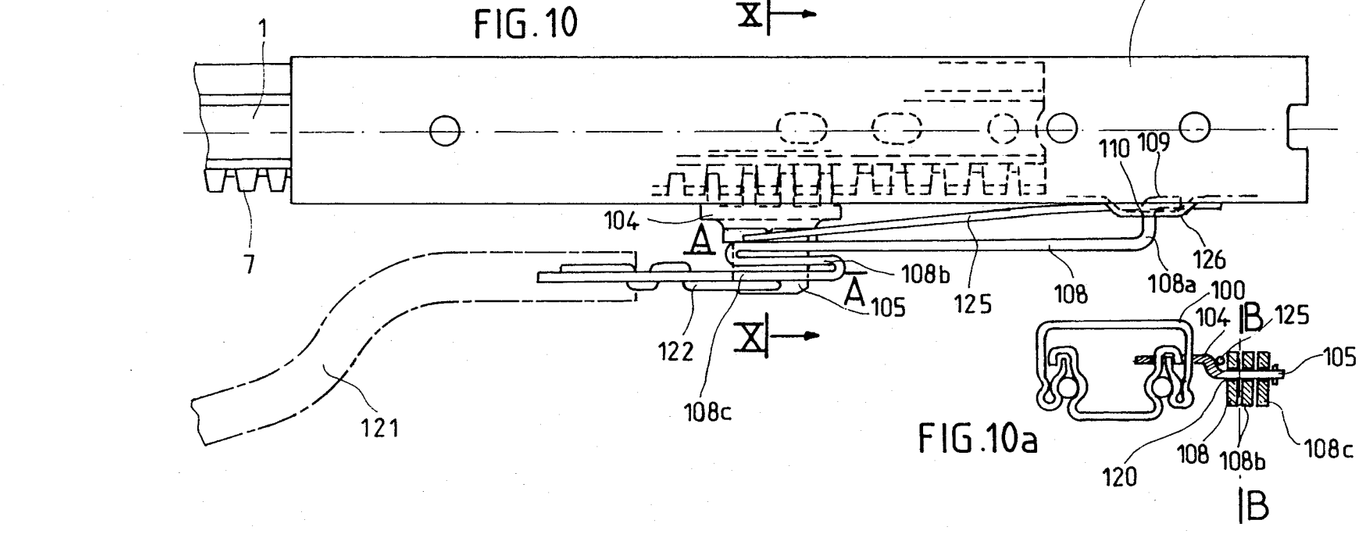
FIG. 10 is a plan view corresponding to FIG. 9.
FIG. 10a is a cross sectional view taken along line X—X of FIG. 10.
Figure 15:
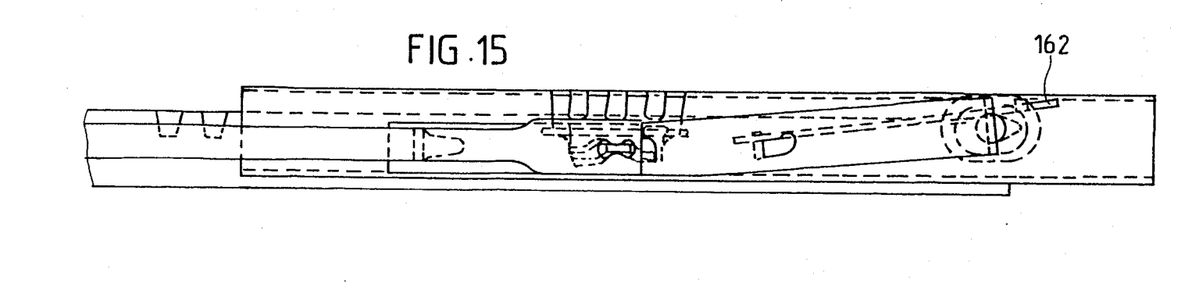
Figure 16:
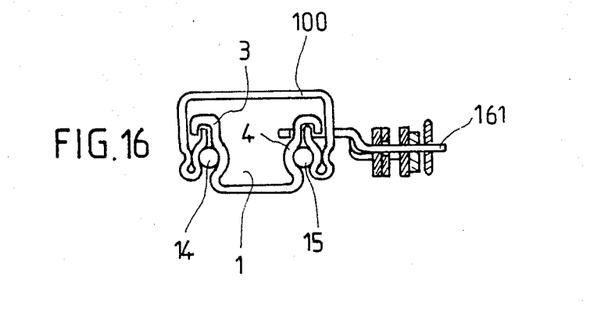
FIG. 16 is a reduced front view of the slide of FIG. 14.
Figure 17:
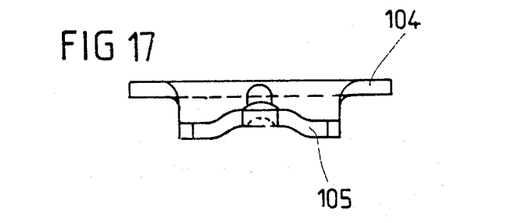
FIGS. 17 and 18 are, respectively, an elevation view and a plan view of the floating latch shown in FIGS. 14, 15 and 16.
Figure 18:
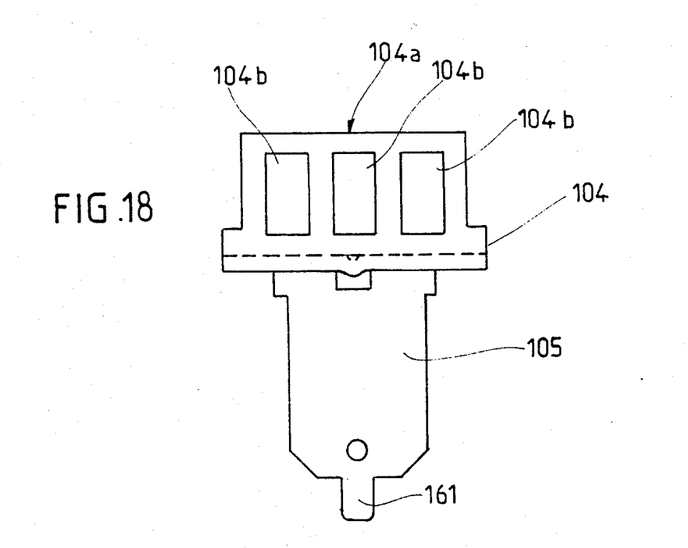

Actually, and as shown in FIGS. 10a, 16 and 18, the floating latch or comb 104 has, in its front portion, a frame 104a formed with rectangular openings 104b forming the latch or comb, and is then prolongated in its rear portion by a tail 105 slightly deformed in the shape of a V (FIGS. 9, 11 and 15) so as to match, as much as possible, the free space left between the rounded portions 102, 103 of the opening 101 formed in the control lever 108 of the slide.

All the other parts being identical to the embodiment of FIGS. 1 to 8, the reference numeral will be the same for identical parts.

Figure 11:
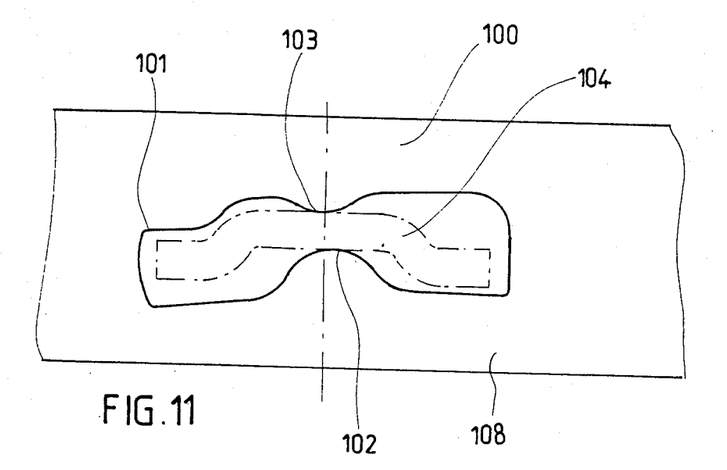
FIG. 11 is an enlarged schematic view of an outer portion of the control lever and of its opening.
Figure 12:
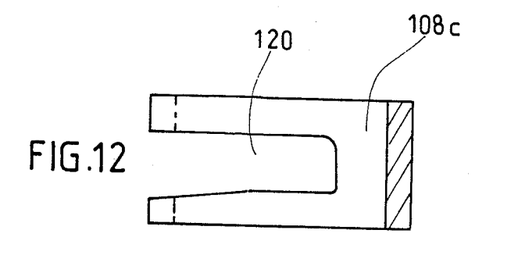
Figure 13:
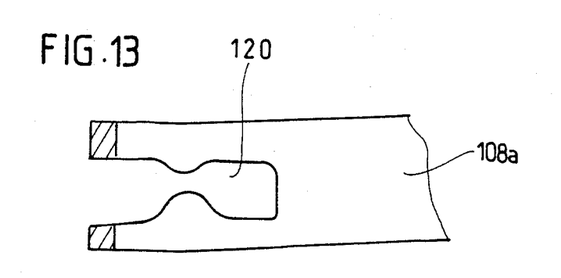

It should be mentioned that the tail 105 of floating latch or comb 104 enables a fixation of a connection part 108 having substantially the shape of a reversed double clothes-peg, or that of a flattened Z. Portion 108a, ending into a hook 109 extending through a hole 110 of the upper profile 100 of the slide, passes through the tail 105 of the floating comb or latch 104 via holes 120, so that the branches 108a, 108b and 108c of the connection piece 108 are rigidly connected to the tail 105 of the latch or comb 104, and finally the end 108c of the connection piece 108 is hooked via any suitable means to the arcuate member 121 controlling the slide.

In the present case, such a hooking is made with assistance of a shaped piece 122 fixed, by one of its ends, with a tail 105 and, by its other end, with the rear free portion of the arcuate element 121.

Finally, it should be noted the presence of the leaf spring 125 which, due to its disposition since it is hooked to a side protuberance 126 of the profile element 100, has a tendency to lower the floating latch or comb 104 into the latching position by penetration of the latch or comb 104 inside the toothing 7 of the lower profile element of the slide.

Figure 14:
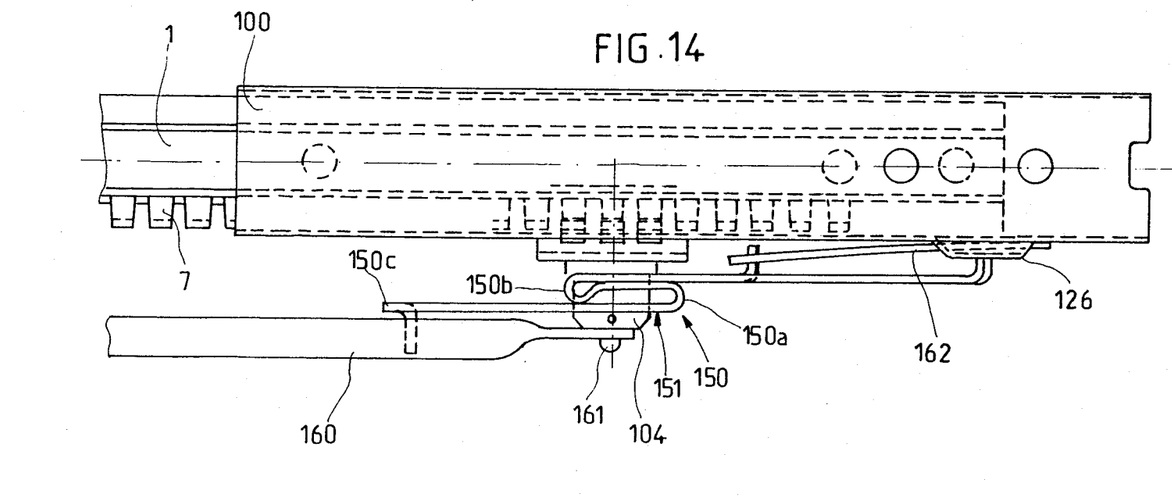
FIGS. 14 and 15 are, respectively, a plan view and a side elevation view of an alternative embodiment of the control lever of the slide.

In FIGS. 14 and 15, the mounting is identical to that of FIGS. 9 to 16, but the connection piece 150 has, in its central zone 151, first a double right angled bent portion 150a at 180° and, in its opposite zone, a bent portion 150b substantially of 360° so as to permit an easy mounting on an arcuate member 160 which is articulated on the rear end 161 of the latch or comb 104. Therefore, the end 150c of the connection piece 150 rigidly connects the arcuate member 160 with the end 161 of the latch or comb 104. A leaf spring 162, placed at the rear of the connection piece 150, and the mounting of which is identical to that of the leaf spring 125, permits an introduction of the comb between the teeth 7 of the lower profile element 1 of the slide.

These two mountings permit therefore the use of this floating comb or latch on all the slides whatever the space left free for the control arcuate member underneath the seat.

We claim:

1. A slide having an upper profile element and a lower profile element designed for making a floating latch slide so as to provide a reliable latching between the fixed lower profile element (1) and the mobile upper profile element (10), wherein the lower profile element (1) is substantially of a U-shaped section and includes wings (3, 4) having each a median zone with a semi-cylindrical channel (3a, 4a) prolongated by a bent-over portion (3b, 4b) provided for covering V-bent vertical ends of side branches (12, 13) of the upper profile element (10) whereby contours are defined on each side of the slide for containing each a set of balls (14, 15) separated by a rod (16), then a wing (3b') of the lower profile element (1) is cut out in order to form a row (6) of teeth (7) having each a trapezoidal shape prolongated by a rectangular shape in order to cooperate with an L-section latch-comb (22) formed with rectangular openings (23), said latch-comb being freely mounted on a pin (24) which pin (24) is displaceable by a control of the slide, then a spring (30) applies to said latch-comb a pressure permitting a passage of teeth (23) of the latch-comb through openings (20) formed in the upper profile element (10) so as to cause a penetration of said latch-comb into said openings (23) between the row (6) of teeth (7) of the lower profile element (1) for latching the upper profile element (10) on the lower profile element (1).

2. A slide as set forth in claim 1, wherein the latch-comb (22) has, in both directions and permanently, an inclination of several degrees with respect to horizontal at a moment of release of latching, thereby allowing the latch-comb to penetrate into the teeth (7) by holding the upper profile element (10) with respect to the lower profile element (1).

3. A slide as set forth in claim 1, wherein the pin (24) of the latch-comb (22) is fixed on a free wing of the latch-comb which is inclined by 90° with respect to a wing in which are formed the openings (23).

4. A slide as set forth in claim 1, wherein the lower profile element (1) has a greater thickness than thickness of the upper profile element (10) which is reinforced by lower formations (12b, 12c, 13b, 13c) of its side wings (12, 13).

5. A slide as set forth in claim 1, wherein balls (14, 15) are contained into channels, said channels having an axis which is offset with respect an axis formed by said balls, so as to obtain a smooth and flexible sliding of the upper profile element (10) on the lower profile element (1).

6. A slide as set forth in claim 1, wherein a control lever (108) for the slide has a lateral opening (101) substantially in a shape of a reversed W, with a central portion of which being formed with two opposite rounded portions (102, 103) serving as pivotment and holding points for a tail (105) of a floating latch (104), a connecting piece (121) being provided for controlling said floating latch and the control lever having a shape of a reverse double clothes-peg or of a flattened Z having one branch articulated on said rounded portion (102, 103) while an other end (109) is introduced inside a free end of the slide.

7. A slide as set forth in claim 6, wherein said floating latch (104) is provided with a tail (105) underneath which is articulated the connecting piece (150) forming two opposite loops around said tail (105), one end being hooked to an arcuate member (160) which is rigidly connected to a rear end (161) of the tail (105), and an other end being hooked to an inner protuberance (126) of the upper profile element (100), whereby forming a unit subjected to a downward movement by a leaf spring (162) forcing the floating latch (104) to penetrate into the teeth (7) of the lower profile element (1).

* * * * *